(12) United States Patent
Lee et al.

(10) Patent No.: US 10,449,836 B2
(45) Date of Patent: Oct. 22, 2019

(54) AIR VENT FOR A VEHICLE

(71) Applicant: NIFCO KOREA INC., Anson-si, Chungcheongnam-do (KR)

(72) Inventors: Young Gook Lee, Asan (KR); Sung Hwa Kim, Ansan (KR)

(73) Assignee: NIFCO KOREA INC., Ansan (KR)

( * ) Notice: Subject to any disclaimer, the term of this patent is extended or adjusted under 35 U.S.C. 154(b) by 196 days.

(21) Appl. No.: 15/513,906

(22) PCT Filed: Sep. 23, 2015

(86) PCT No.: PCT/KR2015/010020
§ 371 (c)(1),
(2) Date: Jul. 3, 2017

(87) PCT Pub. No.: WO2016/048036
PCT Pub. Date: Mar. 31, 2016

(65) Prior Publication Data
US 2018/0126825 A1    May 10, 2018

(30) Foreign Application Priority Data
Sep. 24, 2014    (KR) ......................... 10-2014-0127872

(51) Int. Cl.
*B60H 1/34* (2006.01)
(52) U.S. Cl.
CPC .............. *B60H 1/3442* (2013.01); *B60H 1/34* (2013.01); *B60H 1/3428* (2013.01); *B60H 2001/3478* (2013.01)
(58) Field of Classification Search
CPC ............................ B60H 1/3442; B60H 1/3428

USPC ........................................................ 454/155
See application file for complete search history.

(56) References Cited

U.S. PATENT DOCUMENTS

| 3,602,127 | A | * | 8/1971 | Walker | ................ | B60H 1/3428 |
| | | | | | | 454/316 |
| 3,898,921 | A | * | 8/1975 | Trube | ................... | B60H 1/3428 |
| | | | | | | 454/154 |
| 9,707,826 | B2 | * | 7/2017 | Brinas | ...................... | B60H 1/34 |
| 2011/0217914 | A1 | * | 9/2011 | Marutschke | ......... | B60H 1/3428 |
| | | | | | | 454/152 |
| 2014/0120823 | A1 | * | 5/2014 | Brinas | ...................... | B60H 1/34 |
| | | | | | | 454/155 |

(Continued)

FOREIGN PATENT DOCUMENTS

| DE | 29914962 U1 | * | 10/1999 | .......... | B60H 1/3442 |
| DE | 102007010795 A1 | * | 9/2008 | .......... | B60H 1/3428 |

(Continued)

OTHER PUBLICATIONS

Yamamoto et al, JP2014091377A English machine translation, May 19, 2014 (Year: 2014).*

(Continued)

*Primary Examiner* — Gregory L Huson
*Assistant Examiner* — Phillip Decker
(74) *Attorney, Agent, or Firm* — Porter, Wright, Morris, & Arthur, LLP (57) ABSTRACT

The present invention relates to an air vent for a vehicle, the air vent enabling adjusting of an air discharge direction of an air vent, which is for supplying the outside air to the inside of a vehicle, to various angles as well as diffusing the air being discharged.

3 Claims, 7 Drawing Sheets

(56) References Cited

U.S. PATENT DOCUMENTS

| | | | | |
|---|---|---|---|---|
| 2014/0364045 A1* | 12/2014 | Noichl | ................ | B60H 1/3421 |
| | | | | 454/155 |
| 2015/0202946 A1* | 7/2015 | Inagaki | ................ | B60H 1/3428 |
| | | | | 454/154 |
| 2015/0336445 A1* | 11/2015 | Uehara | ................ | B60H 1/3442 |
| | | | | 454/155 |
| 2017/0326951 A1* | 11/2017 | Frenzel | ................ | B60H 1/3435 |
| 2017/0341488 A1* | 11/2017 | Kim | .................... | B60H 1/3421 |

FOREIGN PATENT DOCUMENTS

| | | | | | |
|---|---|---|---|---|---|
| DE | 102009009241 A1 | * | 8/2010 | .......... | B60H 1/3442 |
| GB | 1407992 A | * | 10/1975 | | |
| JP | 2002-168511 A | | 6/2002 | | |
| JP | 2002-192940 A | | 7/2002 | | |
| JP | 2014-091377 A | | 5/2014 | | |
| KR | 100633928 B1 | * | 10/2006 | | |
| KR | 2011-0052388 A | | 5/2011 | | |
| KR | 2011-0075426 A | | 7/2011 | | |

OTHER PUBLICATIONS

Sakamoto et al, JP2002168511A English machine translation, Jun. 14, 2002 (Year: 2002).*

Jeon, KR20110052388A English machine translation, May 18, 2011 (Year: 2011).*

* cited by examiner

AIR VENT FOR A VEHICLE

BACKGROUND OF THE INVENTION

Technical Field

The present invention relates to an air vent for a vehicle, in which the air discharge direction of an air vent, which is to supply outside air to the inside of a vehicle, can be adjusted at various different angles and the air to be discharged can be diffused.

Background Art

In general, an air vent for a vehicle, which has been typically used for supplying outside air to the inside of a vehicle, includes a plurality of rear vanes provided to be arranged in the vertical direction at the front side in an air vent housing, which has a discharge hole at the front side, a plurality of front vanes provided to be arranged in the right and left directions at the rear side in the air vent housing, and wind direction adjustment knobs are connected and provided to the rear vanes and the front vanes so as to move the rear vanes and the front vanes in the right and left directions and vertical direction.

According to the prior art vehicle air vent, each of the rear vanes is inclined upwards or downwards as the wind direction adjustment knob is moved in the upward or downward direction such that the air discharged through the discharge hole of the air vent housing is adjusted in the up and down directions, and each of the front vanes is inclined to the right or left as the wind direction adjustment knob is moved in the right or left direction such that the air discharged through the discharge hole of the air vent housing is adjusted in the right and left directions.

Figure 1:
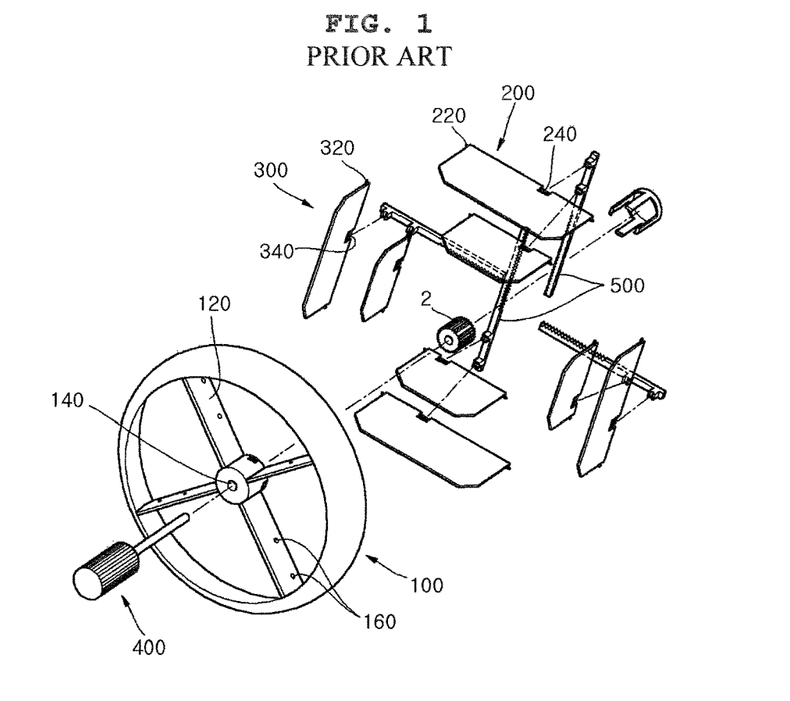
FIG. 1 is an exploded perspective view of a prior art air vent for a vehicle.

Meanwhile, referring to FIG. 1, Korean registered patent publication No. 10-0633928 discloses an air vent provided to a dashboard of a vehicle so as to discharge the air from an air conditioner to the inside of a vehicle, which includes: an air vent housing 100 formed in the shape of a spherical shape, and having support parts 120, which are formed to intersect with each other in the housing such that an insertion hole 140 is formed in the center of the intersection of the support parts 120, and have insertion grooves 160 formed on respective support surfaces of the support parts 120; vertical and horizontal vanes 200, 300 having fitting pieces 220, 320, which are formed at both sides thereof and provided to the insertion grooves 160 of the air vent housing 100 so as to operate, and mounting pieces 240, 340 formed between the fitting pieces 220, 320; an air vent knob 400 provided to the insertion hole 140 of the air vent housing 100 so as to be operated by a user; and operation link parts 500 connected and provided to the mounting pieces 240, 340 of the vertical and horizontal vanes 200, 300 so as to operate according to the operation of the air vent knob 400, and engaged with an adjustment gear 2 at the end portion of the air vent knob 400.

However, the prior art air vent has disadvantages that the air vent is provided to the inlet of a duct, through which air is discharged, and an additional damper for opening or closing the inside of the duct as well as an opening and closing knob for operating the damper have to be added, increasing the number of required parts and making the manufacturing of the air vent complicated.

In addition, the air vent knob and the opening and closing knob, which have to be separately provided to the air vent, make the operation inconvenient and hinder the appearance of the inside of the vehicle.

PRIOR ART DOCUMENTS

Patent Document 1 Korean Patent Registration No. 10-0633928 registered on 4 Oct. 2006—Vehicle Air Vent

SUMMARY OF THE INVENTION

Problems that the Invention is to Solve

Accordingly, the present invention has been derived to solve the above-mentioned problems and disadvantages occurring in the prior arts, and it is an objective of the present invention to provide an air vent for a vehicle, in which the opening or closing of an air path as well as the direction of air to be discharged can be controlled using a rotation type knob dial in a circular air vent, while diffusing the air during the discharge by adjusting the angle of rear vanes by means of the rotation type knob dial.

It is another objective of the present invention to provide an air vent for a vehicle, in which wind direction can be controlled in the up and down directions as well as the right and left directions and the diffusion of the wind direction can be smoothly carried out, while the number of required parts is reduced for simplifying manufacturing, thereby improving productivity and facilitating cost reduction.

Means for Solving the Problems

To accomplish the above objectives, according to the present invention, there is provided an air vent for a vehicle, including:

a duct housing 10 having an air flow path formed therein and a circular air discharge hole 11 provided at the front side thereof;

a nozzle housing 20 spherically coupled and provided to the inside of the duct housing 10 so as to rotate freely in each direction;

a damper 30 having one pair of blocking plates, each of which is rotatably assembled at the rear side of the nozzle housing 20 and has a semicircular shape with a connection gear 31 so as to open or close the rear side of the nozzle housing 20;

a nozzle 40 fixedly coupled to the front side of the nozzle housing 20 and having support members 41, which are formed inside so as to intersect with each other, a fixing member 42 provided with a coupling hole 42*a* in the center thereof, at which the support members 41 intersect with each other, and a pin insertion hole 43 formed at the rear side of the fixing member 42;

a plurality of vanes 50 positioned at the rear side of the support members 41 of the nozzle 40, each having an upper fixing pin 51*a*, which is assembled into the front surface of the nozzle housing 20, and a lower fixing pin 51*b*, which is assembled into the pin insertion hole 43 of the nozzle 40, so as to rotate, and having a guide pin 52 positioned at the rear side of the lower fixing pin 51*b* so as to be assembled passing the rear side of the fixing member 42 of the nozzle 40;

a fixing knob 60 inserted into the coupling hole 42*a* of the nozzle 40 and having a guide groove 61, which is formed in a curved shape at the rear side thereof and fitted with the guide pin 52 of the vane 50;

a knob gear 70 positioned at the rear side of the fixing knob 60 and having an operation gear 71 engaged with the connection gear 31 of the damper 30; and a dial knob 80 integrally assembled into the knob gear 70 at the rear side thereof by penetrating the fixing knob 60 from the front side of the fixing knob 60 so as to operate the nozzle 40 and the damper 30.

In addition, to accomplish the above objectives, according to the present invention, the guide pin 52 of the vane 50 moves along the guide groove 61 of the fixing knob 60 while the fixing knob 60 moves by the pressing of the dial knob 80, such that the vane 50 assembled between the nozzle housing 20 and the nozzle 40 by the upper and lower fixing pins 51a, 51b laterally rotates with respect to the fixing pins by the movement distance of the guide pin 52.

Furthermore, to accomplish the above objectives, according to the present invention, the fixing knob 60 and the dial knob 80 are coupled and fixed to each other, thereby enabling the pressing and the restoring movement of the dial knob 80 and the fixing knob 60.

In the air vent for a vehicle according to the present invention, the discharge of wind is carried out by opening the damper through the rotation of the dial knob, the direction of wind can be adjusted by the rotation of the circular nozzle, and the diffusion of wind can be realized by pressing the dial knob, thereby improving the convenience of use.

In addition, the opening of the air flow path and the diffusion of discharged wind can be realized by operating the dial knob of the air vent such that the number of required parts can be reduced while increasing assembly and productivity, thereby contributing greatly to the cost reduction of the air vent.

BRIEF DESCRIPTION OF THE INVENTION

DETAILED DESCRIPTION OF THE PREFERRED EMBODIMENT

Hereinafter, reference will be now made in detail to the preferred embodiments of the present invention with reference to the attached drawings.

An air vent for a vehicle according to the present invention is derived to allow the air discharge direction of an air vent, which supplies outside air to the inside of a vehicle, to be adjusted at various different angles and diffuse the air to be discharged.

Figure 2:
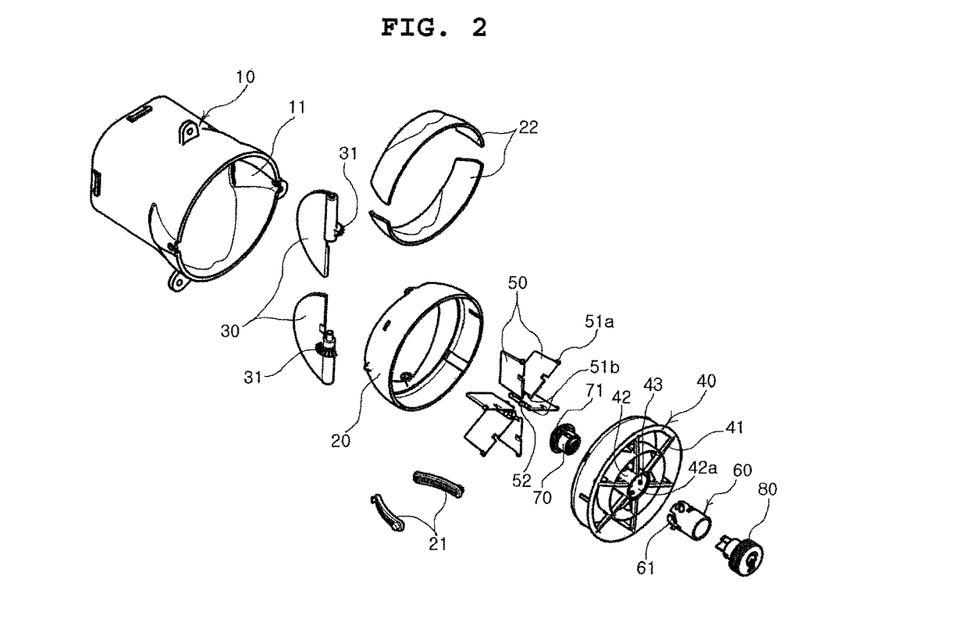
FIG. 2 is an exploded perspective view for illustrating the configuration of an air vent for a vehicle according to the present invention.
Figure 3:
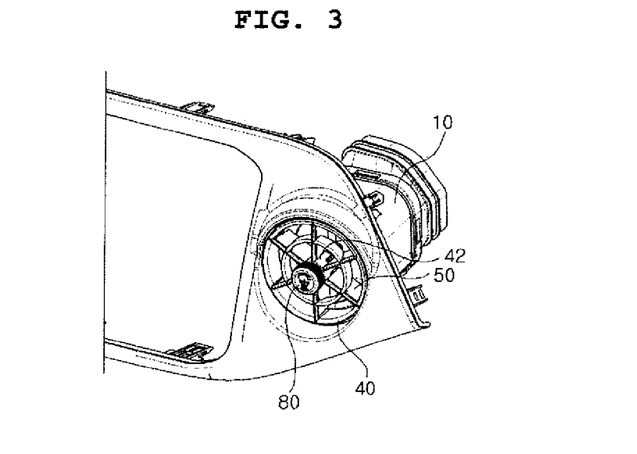
FIG. 3 is a perspective view for illustrating the use state of the air vent according to the present invention.
Figure 4A:
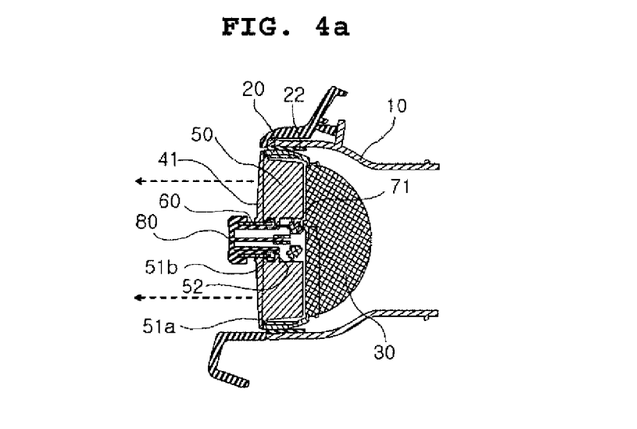
FIG. 4a to FIG. 4c are cross-sectional views for illustrating air discharge directions of the air vent according to the present invention.
Figure 4B:
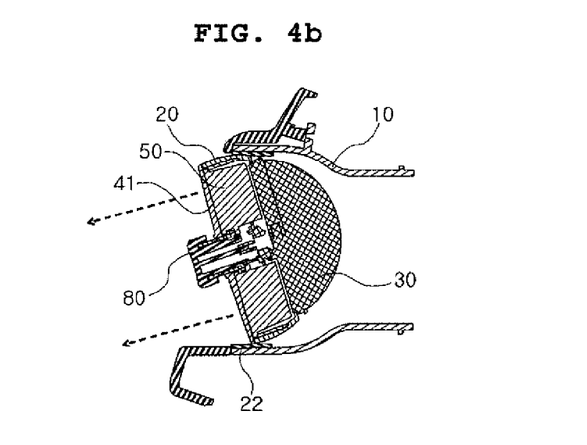
Figure 4C:
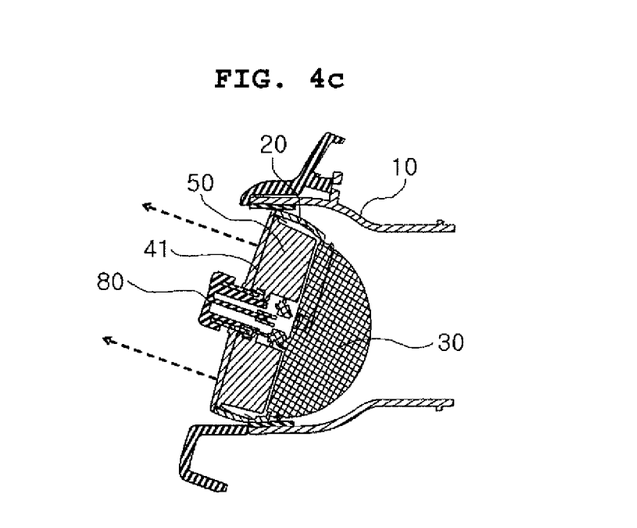

To this end, as shown in FIG. 2 to FIG. 4, an air vent for a vehicle, according to the present invention, includes:

a duct housing 10 having an air flow path formed therein and a circular air discharge hole 11 provided at the front side thereof;

a nozzle housing 20 spherically coupled and provided to the inside of the duct housing 10 so as to rotate freely in each direction;

a damper 30 having one pair of blocking plates, each of which has a semicircular shape with a connection gear 31 and is rotatably assembled at the rear side of the nozzle housing 20 so as to open or close the rear side of the nozzle housing 20;

a nozzle 40 fixedly coupled to the front side of the nozzle housing 20 and having support members 41, which are formed inside so as to intersect with each other, a fixing member 42 provided with a coupling hole 42a in the center thereof, at which the support members 41 intersect with each other, and a pin insertion hole 43 formed at the rear side of the fixing member 42;

a plurality of vanes 50 positioned at the rear side of the support members 41 of the nozzle 40, each having an upper fixing pin 51a, which is assembled into the front surface of the nozzle housing 20, and a lower fixing pin 51b, which is rotatably assembled into the pin insertion hole 43 of the nozzle 40, and having a guide pin 52 positioned at the rear side of the lower fixing pin 51b so as to be assembled passing the rear side of the fixing member 42 of the nozzle 40;

a fixing knob 60 inserted into the coupling hole 42a of the nozzle 40 and having a guide groove 61, which is formed in a curved shape at the rear side thereof and fitted with the guide pin 52 of the vane 50;

a knob gear 70 positioned at the rear side of the fixing knob 60 and having an operation gear 71 engaged with the connection gear 31 of the damper 30; and a dial knob 80 integrally assembled into the knob gear 70 at the rear side thereof by penetrating the fixing knob 60 from the front side of the fixing knob 60 so as to operate the nozzle 40 and the damper 30.

As shown in the drawings, the air vent according to the present invention, which is in a circular shape, has the circular air discharge hole 11 at the front side of the duct housing 10, wherein the nozzle housing 20 provided with the nozzle 40 and the dial knob 80 is spherically coupled to the inside of the discharge hole 11 such that a user can control wind discharge, wind direction change and wind diffusion by operating the dial knob 80.

Herein, the nozzle housing 20 is provided with link members 21 such that the nozzle housing 20 can operate in the right and left directions and the up and down directions only within set angles in the duct housing 10. The nozzle housing 20 is also provided with pad members 22 positioned between the nozzle housing 20 and the duct housing 10 so as to prevent air leakage.

FIG. 4a shows a state, in which the damper 30 is opened and the wind is discharged forwards, FIG. 4b shows a state, in which the nozzle housing 20 is rotated downwards such that the wind is discharged downwards, and FIG. 4c shows a state, in which the nozzle housing 20 is rotated upwards such that the wind is discharged upwards.

Herein, according to the present invention, the guide pin 52 of the vane 50 moves along the guide groove 61 of the fixing knob 60 while the fixing knob 60 moves by the pressing of the dial knob 80, such that the vane 50 assembled between the nozzle housing 20 and the nozzle 40 by the upper and lower fixing pins 51a, 51b laterally rotates with respect to the fixing pins by the movement distance of the guide pin 52 and thus the wind, which moves forwards, is discharged and diffused along the rotated vane 50.

Figure 5A:
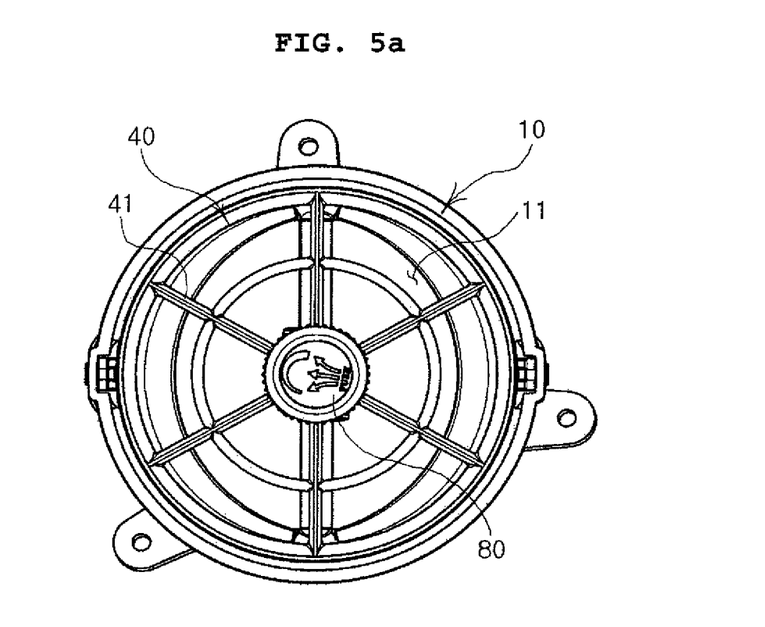
FIG. 5a is a front view for showing a state, in which a path is closed by a damper of the air vent according to the present invention.
Figure 5B:
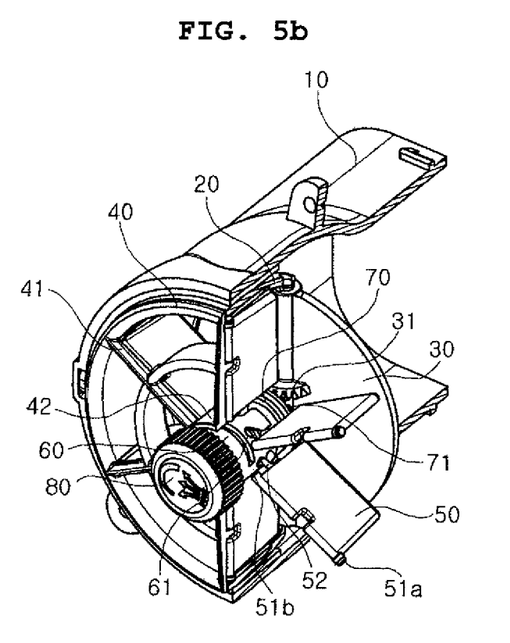
FIG. 5b is a perspective view for showing the state, in which the path is closed by the damper of the air vent according to the present invention.

Explaining use embodiments of the air vent for a vehicle according to the present invention as structured above, as shown in FIG. 5a and FIG. 5b, when the dial knob 80 is rotated to the left, the damper 30 closes the air flow path of the duct housing 10 such that air is not discharged.

Figure 6A:
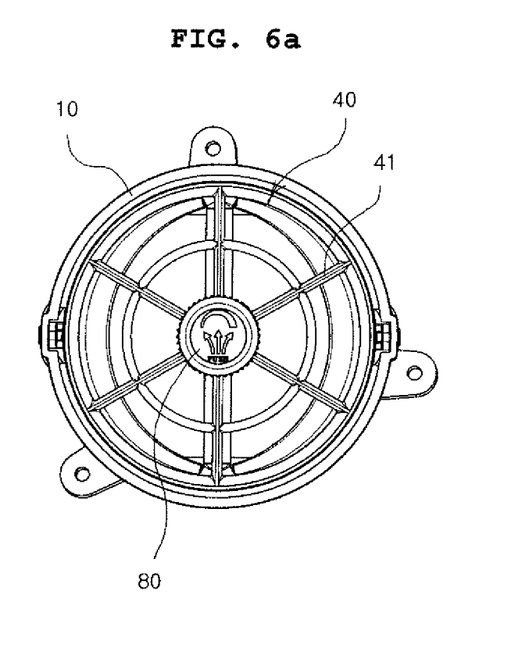
FIG. 6a is a front view for showing a state, in which the path is opened by the damper of the air vent according to the present invention.
Figure 6B:
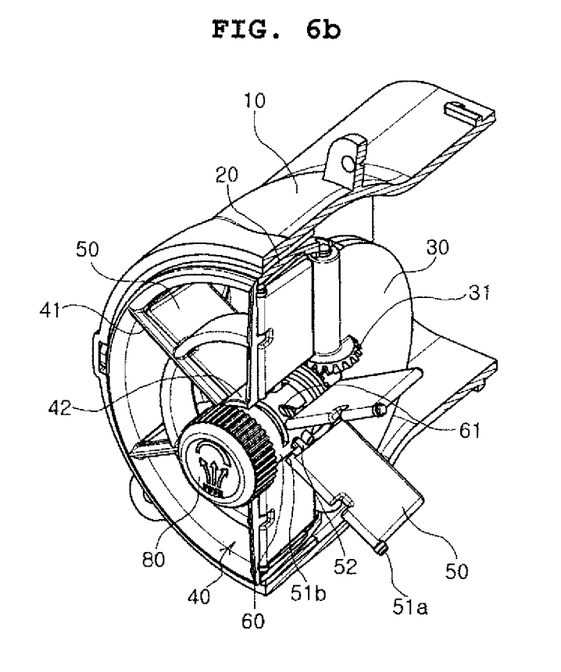
FIG. 6b is a perspective view for showing the state, in which the path is opened by the damper of the air vent according to the present invention.

Herein, if the dial knob 80 is rotated to the right, as shown in FIG. 6b, the knob gear 70 integrally coupled to the dial knob 80 is also rotated together with the dial knob 80 and operates the connection gear 31, which is engaged with the operation gear 71, such that the damper 30 is rotated and opens the air path of the duct housing 10, as shown in FIG. 6b. Therefore, air flows through the air discharge hole 11 and is concentratedly discharged along the directions of the vane 50 and the nozzle 40.

Figure 7A:
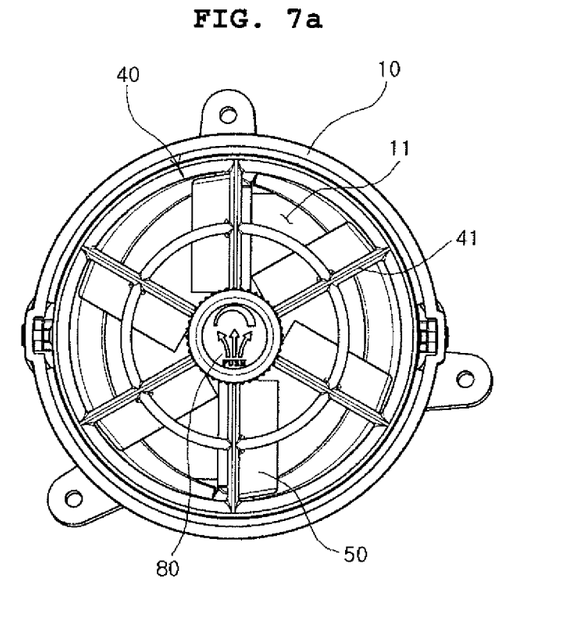
FIG. 7a is a front view for showing a state, in which a dial knob is pressed such that vanes are rotated.
Figure 7B:
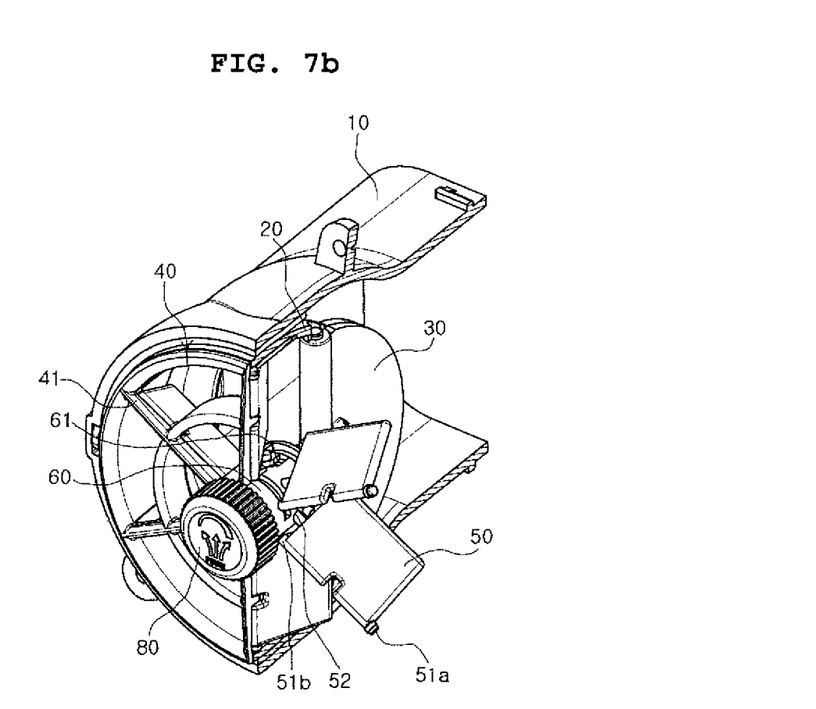
FIG. 7b is a perspective view for showing a state, in which the vanes of the air vent are rotated such that wind is discharged and diffused.

In addition, as shown in FIG. 7a and FIG. 7b, if the dial knob 80 is pressed, then the fixing knob 60, which is integrally coupled to the dial knob 80, moves in the pressing direction and thus the guide pin 52 of the vane 50, which is fitted into the guide groove 61, also moves along the guide groove 61.

Figure 8A:
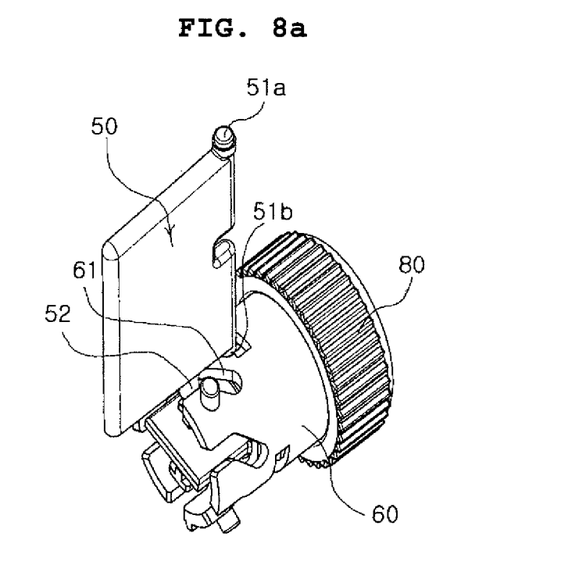
FIGS. 8a and 8b are perspective views for illustrating the rotation operations of the vanes according the pressing of the dial knob.
Figure 8B:
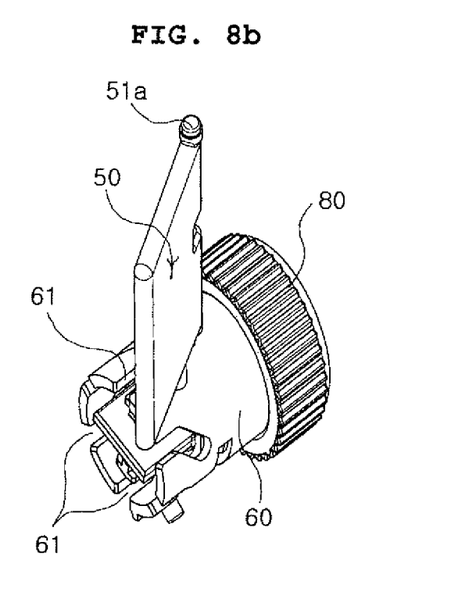

In more detail, when the guide pin 52 of the vane 50 moves, as shown in FIG. 8a, along the guide groove 61 in response to the pressing of the dial knob 80, then the guide pin 52, which is positioned at the rear side with respect to the upper and lower fixing pins 51a, 51b at the front side of the vane 50, moves along the curved guide groove 61 and the vane 50 rotates in the lateral direction, as shown in FIG. 8b.

Therefore, the direction of the air discharged forwards through the plurality of vanes 50, which are coupled to the inside of the air vent, is induced to be diffused by the vanes 50.

It would be apparent to a person skilled in the art that the present invention described hereinabove is not to be limited to the foregoing description, and various replacements, modifications, and changes could be made without departing from the scope of the present invention.

What is claimed is:

1. An air vent for a vehicle, comprising:
    a duct housing (10) having an air flow path formed therein and a circular air discharge hole (11) provided at a front side thereof;
    a nozzle housing (20) spherically coupled and provided to an inside of the duct housing (10) so as to rotate freely in each direction;
    a damper (30) having one pair of blocking plates, each of which has a semicircular shape with a connection gear (31) and is rotatably assembled at a rear side of the nozzle housing (20) so as to selectively open or close the rear side of the nozzle housing (20);
    a nozzle (40) fixedly coupled to a front side of the nozzle housing (20) and having support members (41), which are formed inside so as to intersect with each other, a fixing member (42) provided with a coupling hole (42a) in a center thereof, at which the support members (41) intersect with each other, and a pin insertion hole (43) formed at a rear side of the fixing member (42);
    a plurality of vanes (50) positioned at a rear side of the support members (41) of the nozzle (40), each having an upper fixing pin (51a), which is assembled into a front surface of the nozzle housing (20), and a lower fixing pin (51b), which is assembled into the pin insertion hole (43) of the nozzle (40), so as to rotate, and having a guide pin (52) positioned at a rear side of the lower fixing pin (51b) so as to be assembled passing the rear side of the fixing member (42) of the nozzle (40);
    a fixing knob (60) inserted into the coupling hole (42a) of the nozzle (40) and having a guide groove (61), which is formed in a curved shape at a rear side thereof and fitted with the guide pin (52) of the vane (50);
    a knob gear (70) positioned at the rear side of the fixing knob (60) and having an operation gear (71) engaged with the connection gear (31) of the damper (30); and
    a dial knob (80) integrally assembled into the knob gear (70) at a rear side thereof by penetrating the fixing knob (60) from the front side of the fixing knob (60) so as to selectively operate the plurality of vanes (50) of the nozzle (40) by pressing and pulling the dial knob (80) and to selectively operate the blocking plates of the damper (30) by rotation of the dial knob (80),
    wherein the knob gear (70) is secured to the dial knob (80) for rotation with the dial knob (80), and the fixing knob (60) is secured between dial knob (80) and the knob gear (70) for longitudinal movement of the fixing knob (60) with the dial knob (80) but not rotation of the fixing knob (60) with the dial knob (80).

2. The air vent for a vehicle according to claim 1, wherein the guide pin (52) of the vane (50) moves along the guide groove (61) of the fixing knob (60) while the fixing knob (60) moves by pressing the dial knob (80), such that the vane (50) assembled between the nozzle housing (20) and the nozzle (40) by the upper and lower fixing pins (51a, 51b) laterally rotates with respect to the fixing pins by a movement distance of the guide pin (52).

3. The air vent for a vehicle according to claim 1, wherein the fixing knob (60) and the dial knob (80) are coupled and fixed to each other, thereby enabling pressing and restoring movement of the dial knob (80) and the fixing knob (60).

* * * * *